2,799,695

HYDROPEROXIDES OF ISOPROPYLPHENYL ESTERS

Milton A. Taves, Wilmington, Del., assignor to Hercules Powder Company, Wilmington, Del., a corporation of Delaware No Drawing. Application November 3, 1954, Serial No. 466,657

10 Claims. (Cl. 260—456)

This invention relates to organic hydroperoxides and more particularly to hydroperoxides of isopropylphenyl esters.

While the oxidation of the isopropyl group of isopropyl-substituted benzenes to hydroperoxyisopropyl compounds is well known, the production of hydroperoxyisopropyl aromatic compounds in which there is an oxygen attached directly to the aromatic ring is unknown.

Now in accordance with the present invention, it has been found that difficultly saponifiable esters of isopropylphenols are converted into the corresponding hydroperoxyisopropylphenyl esters by intimately contacting the difficultly saponifiable isopropylphenyl ester in the liquid state with an oxygen containing gas at a temperature in the range of about 20° C. to about 125° C. in the presence of an antacid.

The difficultly saponifiable isopropylphenyl esters which are oxidizable in accordance with this invention are isopropylphenyl esters of organic acids which are not saponified by contact with small amounts, up to about 2% by weight of the ester, of an alkali earth metal oxide or hydroxide at temperatures in the range of 100° C. to 125° C. in the presence of steam.

The following examples constitute specific illustrations of the process and products of this invention. All parts are based on parts by weight.

Example 1

Oxygen was bubbled at atmospheric pressure at a rate of $\frac{1}{7}$ part by weight/min. through a mixture of 27 parts p-isopropylphenyl benzoate and 0.27 part calcium hydroxide. The reaction was maintained at 100° C. and was initiated with an ultraviolet lamp that was turned off after the formation of 0.4% hydroperoxide. Analysis of the product for active oxygen indicated that p-isopropylphenyl benzoate hydroperoxide formed at the following rate:

| Time (hours): | Percent hydroperoxide |
|---|---|
| 4 | 0.4 |
| 52 | 0.7 |
| 75 | 1.2 |
| 118 | 2.8 |
| 133 | 4.8 |
| 166 | 9.4 |
| 190 | 26.0 |
| 195 | 32.0 |

The average rate of oxidation including the induction period caused by the presence of a trace of p-isopropylphenol in the ester was 0.16% hydroperoxide per hour. The maximum rate after the induction period was 1.1% hydroperoxide per hour.

The oxidation mixture was diluted with 15 parts hexane at the end of this oxidation period in order to facilitate removal of crystalline material which had formed. Crystalline hydroperoxyisopropylphenyl benzoate amounting to 0.3 parts was removed by filtration. It was further purified by crystallization from a 1:1 hexane-benzene solution to a melting point of 115–115.5° C.

The substitution of p-isopropylphenyl toluate, p-isopropylphenyl α-naphthoate, p-isopropylphenyl β-naphthoate, or p-isopropylphenyl 3,5-dimethylbenzoate in Example 1 for p-isopropylphenyl benzoate leads similarly to the corresponding p-hydroperoxyphenyl ester which on acid catalyzed cleavage and subsequent saponification yields hydroquinone.

Example 2

Oxygen was bubbled through a mixture of 30 parts p-isopropylphenyl p-toluenesulfonate and 0.3 part calcium hydroxide according to the conditions of Example 1. p-Isopropylphenyl p-toluenesulfonate hydroperoxide formed at the following rate, as indicated by analyses for active oxygen.

| Time (hours): | Percent hydroperoxide |
|---|---|
| 5 | 0.5 |
| 23 | 0.8 |
| 30 | 1.2 |
| 46 | 2.6 |
| 54 | 4.1 |
| 70 | 9.8 |
| 78 | 14.6 |
| 85 | 19.2 |
| 103 | 31.7 |

The average oxidation rate was 0.3% hydroperoxide per hour and the maximum rate was 0.8% hydroperoxide per hour.

The oxidation mixture was diluted with 20 parts hexane at the end of this oxidation and the crystalline hydroperoxide was separated by filtration. Crystalline hydroperoxyisopropylphenyl p-toluenesulfonate amounting to 0.26 part was recovered. It melted, after further crystallization from 1:1 hexane-benzene solution, at 54–55° C.

The substitution of p-isopropylphenyl benzenesulfonate, p-isopropylphenyl naphthalenesulfonate, or p-isopropylphenyl xylenesulfonate in Example 2 leads similarly to the corresponding p-hydroperoxyphenyl esters which on cleavage in the presence of mineral acids and subsequent saponification yield hydroquinone.

Example 3 p-Isopropylphenyl trimethylacetate, prepared by heating trimethylacetyl chloride with p-isopropylphenol and carefully purified, was heated to 100° C. and the liquified ester admixed with 2% by weight sodium carbonate powder was contacted with a dispersion of oxygen for 24.5 hours at the end of which time the conversion to hydroperoxide amounted to 31.7%. The hydroperoxide was precipitated from a portion of the oxidized ester by adding hexane and cooling to 0° C. The p-isopropylphenyl trimethylacetate hydroperoxide was further purified by crystallization from hexane. The pure hydroperoxide melted at 83–83.5° C.

In a repetition of each of the above examples the isopropylphenyl ester was purified before oxidation by passing a 6% solution thereof in hexane through a column of adsorption grade alumina to remove traces of isopropylphenol. This treatment greatly shortened the induction period.

The process of this invention is applicable also to o- and m-isopropylphenyl esters which are difficultly saponifiable. The p-isopropylphenyl esters are the most readily oxidized and the o-isopropylphenyl esters are the least readily oxidized.

The oxidation temperature is any temperature in the range of about 20° C. to about 125° C., the preferred temperature being in the range of 70–115° C.

The oxidation process for converting the ester of the isopropylphenol to the hydroperoxide is carried out under carefully controlled conditions such that the ester is not saponified in the course of the oxidation. In order to prevent acid catalyzed cleavage of the hydroperoxide formed in the oxidation, an antacid is used in an amount sufficient to neutralize any acids formed in the oxidation. The antacid which is used must not be so alkaline as to saponify the ester under the oxidation conditions. Antacids which satisfy this requirement and are useful in this process are sodium and potassium carbonates and bicarbonates and calcium and barium hydroxides and oxides. The oxidation may be carried out in the presence of absence of water using any of these antacids. However, it is preferable to use a nonaqueous system in which water, other than traces formed in the oxidation process, is absent. When water is present the antacid used may be in solution or partly in suspension. When water is absent the antacid is preferably used in finely divided form dispersed throughout the oxidation mixture.

The oxidation is carried out as rapidly as possible and to this end dispersive devices for the oxygen are used along with rapid stirring. The oxidation is continued to as high a conversion as is possible or at least to a conversion in the range of 5 to about 40%.

If desired, the hydroperoxide can be separated from the isopropylphenyl ester by caustic extraction in the cold in order to concentrate the hydroperoxide. The hydroperoxide is readily liberated from the caustic solution by careful acidification with dilute mineral acid. The hydroperoxyisopropylphenyl ester may also be separated by crystallization directly from the oxidate where crystalline products are produced. Crystallization is aided by the addition of a hydrocarbon solvent in which the hydroperoxy esters have limited solubility.

In all of the products of this invention, the hydroperoxy group is on the α-carbon of the isopropyl group of the isopropylphenyl esters oxidized in accordance with this invention.

The present process is a particularly useful method of converting isopropylphenols formed as by-products in the cleavage of the hydroperoxide mixture resulting from oxidation of diisopropylbenzenes into more desirable end products.

The hydroperoxyisopropylphenyl esters of this invention may be warmed with catalytic amounts of acid to cause cleavage into monoesters of dihydric phenols which by further treatment gives the corresponding dihydric phenol: resorcinol or hydroquinone. They may also be reduced chemically or catalytically to hydroxyisopropylphenyl ester. The hydroperoxyisopropylphenyl esters of this invention also find utility per se as polymerization catalysts particularly for use in polyester moulding powders where the low volatility and taste-free properties of the catalysts and their decomposition products are advantageous.

What I claim and desire to protect by Letters Patent is:

1. The method of producing a p-hydroperoxyisopropylphenyl ester which comprises intimately contacting a difficultly hydrolyzable p-isopropylphenyl ester in the liquid state with an oxygen containing gas at a temperature in the range of about 20° C. to about 125° C. in the presence of an antacid.

2. The method of producing a p-hydroperoxyisopropylphenyl ester which comprises intimately contacting a p-isopropylphenyl arylcarboxylate in the liquid state with an oxygen containing gas at a temperature in the range of about 20° C. to about 125° C. in the presence of an antacid.

3. The method of producing p-hydroperoxyisopropylphenyl benzoate which comprises intimately contacting p-isopropylphenyl benzoate in the liquid state with an oxygen containing gas at a temperature in the range of about 20° C. to about 125° C. in the presence of an antacid.

4. The method of producing a p-hydroperoxyisopropylphenyl ester which comprises intimately contacting a p-isopropylphenyl arylsulfonate in the liquid state with an oxygen containing gas at a temperature in the range of about 20° C. to about 125° C. in the presence of an antacid.

5. The method of producing p-hydroperoxyisopropylphenyl p-toluenesulfonate which comprises intimately contacting p-isopropylphenyl p-toluenesulfonate in the liquid state with an oxygen containing gas at a temperature in the range of about 20° C. to about 125° C. in the presence of an antacid.

6. The method of producing p-hydroperoxyisopropylphenyl trimethylacetate which comprises intimately contacting p-isopropylphenyl trimethylacetate in the liquid state with an oxygen containing gas at a temperature in the range of about 20° C. to about 125° C. in the presence of an antacid.

7. As a new composition of matter a material of the group consisting of p-hydroperoxyisopropylphenyl arylcarboxylate, p-hydroperoxyisopropylphenyl arylsulfonate and p-hydroperoxyisopropylphenyl trimethylacetate.

8. As a new composition of matter p-hydroperoxyisopropylphenyl benzoate.

9. As a new composition of matter p-hydroperoxyisopropylphenyl p-toluenesulfonate.

10. As a new composition of matter p-hydroperoxyisopropylphenyl trimethylacetate.

References Cited in the file of this patent
UNITED STATES PATENTS

| | | |
|---|---|---|
| 2,633,476 | Seubold | Mar. 31, 1953 |
| 2,671,809 | Fortuin | Mar. 9, 1954 |
| 2,683,751 | Filar | July 13, 1954 |